United States Patent
Westhoff et al.

(10) Patent No.: US 11,702,563 B2
(45) Date of Patent: Jul. 18, 2023

(54) TWO-COMPONENT COATING COMPOSITIONS FOR COATING FIBER-REINFORCED PLASTICS MATERIALS

(71) Applicant: BASF Coatings GmbH, Münster (DE)

(72) Inventors: Elke Westhoff, Muenster (DE); Henan Li, Ludwigshafen (DE); Markus Saedler, Muenster (DE); Andreas Dopp, Muenster (DE); Lea Fedeler, Muenster (DE)

(73) Assignee: BASF COATINGS GMBH, Münster (DE)

( * ) Notice: Subject to any disclaimer, the term of this patent is extended or adjusted under 35 U.S.C. 154(b) by 668 days.

(21) Appl. No.: 16/631,334

(22) PCT Filed: Jul. 20, 2018

(86) PCT No.: PCT/EP2018/069797
§ 371 (c)(1),
(2) Date: Jan. 15, 2020

(87) PCT Pub. No.: WO2019/020524
PCT Pub. Date: Jan. 31, 2019

(65) Prior Publication Data
US 2020/0208009 A1 Jul. 2, 2020

(30) Foreign Application Priority Data
Jul. 25, 2017 (EP) .................................. 17183052

(51) Int. Cl.
| | | |
|---|---|---|
| *C08G 18/48* | (2006.01) | |
| *C09D 175/06* | (2006.01) | |
| *B29C 45/00* | (2006.01) | |
| *B29C 45/14* | (2006.01) | |
| *B29C 70/48* | (2006.01) | |
| *C08G 18/24* | (2006.01) | |
| *C08G 18/28* | (2006.01) | |
| *C08G 18/32* | (2006.01) | |
| *C08G 18/42* | (2006.01) | |
| *C08G 18/66* | (2006.01) | |
| *C08G 18/78* | (2006.01) | |

(Continued)

(52) U.S. Cl.
CPC ........ *C09D 175/06* (2013.01); *B29C 45/0001* (2013.01); *B29C 45/0053* (2013.01); *B29C 45/14* (2013.01); *B29C 70/48* (2013.01); *C08G 18/246* (2013.01); *C08G 18/2825* (2013.01); *C08G 18/325* (2013.01); *C08G 18/3206* (2013.01); *C08G 18/4241* (2013.01); *C08G 18/4825* (2013.01); *C08G 18/6674* (2013.01); *C08G 18/7837* (2013.01); *C08G 18/792* (2013.01); *B29C 2045/0079* (2013.01); *B29K 2067/00* (2013.01)

(58) Field of Classification Search
CPC . B29C 45/0001; B29C 45/0053; B29C 45/14; B29C 70/48; B29C 2045/0079; B29K 2067/00; C08G 18/246; C08G 18/2825; C08G 18/3206; C08G 18/325; C08G 18/3228; C08G 18/3234; C08G 18/3246; C08G 18/4241; C08G 18/4825; C08G 18/4833; C08G 18/5096; C08G 18/6674; C08G 18/7837; C08G 18/792; C09D 175/06
See application file for complete search history.

(56) References Cited

U.S. PATENT DOCUMENTS

| | | | |
|---|---|---|---|
| 3,905,929 A | * | 9/1975 | Noll .................... C08G 18/5042 528/65 |
| 5,670,599 A | * | 9/1997 | Bassner ................. C08G 18/10 521/159 |
| 2004/0249108 A1 | | 12/2004 | Dietrich et al. |

(Continued)

FOREIGN PATENT DOCUMENTS

| | | |
|---|---|---|
| JP | H04358829 A | 12/1992 |
| JP | 2004359958 A | 12/2004 |

(Continued)

OTHER PUBLICATIONS

English translation of International Search Report for International Application No. PCT/EP2018/069797, dated Sep. 19, 2018, 2 pages.

(Continued)

*Primary Examiner* — John M Cooney
(74) *Attorney, Agent, or Firm* — Armstrong Teasdale LLP

(57) ABSTRACT

The present disclosure relates to two-component coating material compositions including a paint base component A and a curing component B. The paint base component A includes one or more polyols A1 selected from the group of polyols containing ester groups and which possess a hydroxyl number of 300 to 500 mg KOH/g and have a hydroxyl group functionality of greater than 2. The curing component B includes one or more polyisocyanates B1 having on average 2.4 to 5 NCO groups. The two-component coating material composition possesses a solids content of at least 96 wt %, and the molar ratio of the NCO groups in the curing component B to the acidic hydrogen atoms in the paint base component A is from 1:1.15 to 1:0.95. The disclosure further relates to a method for coating fiber-reinforced plastics and to a method for producing coated fiber-reinforced plastics, and to coating fiber-reinforced plastics.

20 Claims, No Drawings

(51) Int. Cl.
     *C08G 18/79*          (2006.01)
     *B29K 67/00*          (2006.01)

(56) References Cited

U.S. PATENT DOCUMENTS

| | | |
|---|---|---|
| 2010/0200890 A1 | 8/2010 | Tomiyama et al. |
| 2014/0232041 A1 | 8/2014 | Han et al. |
| 2017/0275494 A1 | 9/2017 | Jahns et al. |

FOREIGN PATENT DOCUMENTS

| | | |
|---|---|---|
| JP | 2008024896 A | 2/2008 |
| JP | 2015224321 A | 12/2015 |
| JP | 2016507000 A | 3/2016 |
| WO | 2008133271 A1 | 7/2010 |
| WO | 2016016139 A1 | 2/2016 |

OTHER PUBLICATIONS

Renkl, J. et al. Ready for Painting. Kunststoffe International. 2014. vol. 3, pp. 86-89.

\* cited by examiner

TWO-COMPONENT COATING COMPOSITIONS FOR COATING FIBER-REINFORCED PLASTICS MATERIALS

CROSS-REFERENCE TO RELATED APPLICATIONS

This application is a U.S. National Phase Application of PCT/EP2018/069797, filed Jul. 20, 2018, which claims the benefit of priority to EP Application No. 17183052.4, filed Jul. 25, 2017, the contents of which are hereby expressly incorporated by reference in their entirety.

The present invention relates to two-component coating material compositions for coating fiber-reinforced composite and plastics materials which are suitable more particularly for the overmolding process (injection in-mold coating process), to a method for coating such materials and to the use of the two-component coating material compositions for producing coated fiber-reinforced composite and plastics materials, particularly in a multicoat coating process.

There is an ongoing demand for materials which allow a reduction in weight of vehicle bodies and parts thereof, especially for the purpose of reducing the fuel consumption and hence the carbon dioxide emissions. The materials are further required to be readily moldable and thus to allow the maximum of construction freedom. Suitable substrates in the prior art which already allow a certain reduction in weight are, for example, aluminum and high-performance steels. Increasingly, however, materials such as fiber-reinforced composite materials and fiber-reinforced plastics are coming under the scrutiny of the automakers. Such materials are involved in particular in the area of the vehicle roof, the hood, the vehicle doors, and the tail parts. A challenge when using these materials, however, is that they cannot be coated on the finishing line and are nevertheless required to display outstanding surface quality after one coating (Class A surface).

But fiber-reinforced composite materials and fiber-reinforced plastics usually have an irregular surface structure, which is normally rough and in some cases also has open fibers, with an irregularity which, after coating, propagates through the coating layers, generally primer-surfacer coats, basecoats, and clearcoats, through to the finish surface. The propagation of the structuring of the substrate surface up to the surface of the uppermost coating material film can be traced back to differences in the thermal expansion coefficient of the fibers in the fiber-reinforced material and that of the plastics matrix surrounding them. Particularly in the case of visible components in the area of vehicle bodies, this represents a major problem.

Already on the market are motor vehicles whose body is an all-composite shell construction based on a carbon-fiber-reinforced composite material possessing a Class A surface. The multicoat coating, however, is produced in a highly technically complex coating architecture, with a plurality of surfacer coats, basecoats and clearcoats in each case, and with a plurality of intermediate sanding steps plus a final polishing step.

There is therefore an effort to provide a simple coating method, especially for fiber-reinforced composite materials and fiber-reinforced plastics, in which the multiplicity of intermediate coats, ahead of the final coating with a basecoat film and a clearcoat film, are replaced as far as possible by one coating material film, which can be applied at a high film thickness, which effectively prevents propagation of the irregular substrate surface, which adheres outstandingly to the substrate without primer-surfacer, and which can be coated with standard commercial basecoat and clearcoat materials without costly and inconvenient cleaning and/or sanding steps.

Conventional spray application does not allow the production of high film thicknesses of more than 100 µm or even more than 150 µm in this way, if the desire is for a Class A surface quality. On the other hand, there is also no desire to produce unnecessarily thick coating material films, since to do so would be to lose the weight saving gained by employing fiber-reinforced plastics components.

Possible methods with which variable and also high film thicknesses may be produced are the overmolding process (injection in-mold coating process) or the conventional in-mold coating process.

With the conventional in-mold coating process, a mold surface is coated by spraying or injecting with the coating material, after which the fiber-reinforced composite material substrate or the fiber-reinforced plastics substrate is pressed onto the uncured, or as yet not fully cured, coating material.

In the case of the overmolding process, the coating material composition is injected into a gap between substrate and mold surface. Flashing off or preliminary drying of the coating material is not possible with this process, and so the only coating materials that can be used are those which are free or virtually free from volatile constituents, but are therefore eco-friendly. Solvents which are able to react with other constituents of the coating material, known as reactive diluents, can also be used in the overmolding process, however. Terms used in such a case are solvent-free coating materials or coating material systems with 100% solids. In practice, however, even systems of this kind may contain very small amounts of volatile organic solvents, which then enter the formula in general via additives predissolved in solvents. As a result of the gap width between substrate and mold surface, the film thickness of the coating material film can be mandated very precisely in the case of the overmolding process.

One particular variant of the overmolding process is that known as surface resin transfer molding (surface RTM process); see Renkl, Schmidhuber & Fries in: *Kunststoffe* March 2014, pages 86-89.

All processes where the coating material is in contact with a mold surface, however, also require that the coating be demolded from the mold surface without damage to the surface. Conventionally, this can be achieved by providing the mold surface, prior to use, with a mold release agent. When a mold release agent is used, however, after the coating of the substrate with the coating material, this agent remains in part on the mold surface, but also on the coating material surface. Before subsequent coating with a basecoat material, for example, this residue of agent must be removed by a costly and inconvenient cleaning process. One of the objects of the present invention, therefore, was to provide a coating material which, without use of an external release agent of this kind, permits damage-free demolding from the normally metal mold surface, while yet ensuring outstanding adhesion to the substrate, and being recoatable with a further coating film, as for example a basecoat and clearcoat, to form a Class A surface, without costly and inconvenient subsequent steps of cleaning and/or of sanding. Furthermore, rapid curing of the coating material in high film thicknesses at relatively low curing temperatures ought to be possible.

The objects stated above have been achieved, surprisingly, through provision of a two-component coating material composition which comprises a paint base component A and a curing component B, wherein the paint base component A i. comprises one or more polyols A1 which are selected from the group of polyols containing ester groups and which possess a hydroxyl number of 300 to 500 mg KOH/g and have a hydroxyl group functionality of greater than 2;

ii. one or more aliphatic polyols A2 free from ether groups and ester groups, of the general formula (I)

in which $R^1$ is a p-valent branched, cyclic or linear, saturated or unsaturated, aliphatic hydrocarbon radical having 5 to 18 carbon atoms, the radical $R^1$ optionally comprising one or more tertiary amino groups, and p is 2 to 6;

iii. one or more species A3 of the general formula (II)

in which $R^2$ is a saturated or unsaturated, aliphatic hydrocarbon radical having 6 to 30 carbon atoms, $R^3$ is H, a radical $PO(OH)_2$, or the optionally partially phosphated radical of a mono- or disaccharide, or the optionally partially phosphated radical of an alditol, AO represents one or more alkylene oxide radicals selected from the group consisting of ethylene oxide, propylene oxide and butylene oxide, r is 0 or 1, and s is 0 to 30;

iv. one or more crosslinking catalysts A4 selected from the group of organo tin compounds;

v. optionally one or more polyamines A5 having at least two secondary amino groups and an amine number of 120 to 280 mg KOH/g;

vi. optionally one or more polyether diols A6;

vii. optionally one or more polyether-modified alkylpolysiloxanes A7;

viii. optionally one or more pigments A8 and/or one or more fillers A8; and ix. optionally one or more additives A9 selected from the group consisting of wetting and/or dispersing agents, rheological assistants, and flow control agents;

and wherein the curing component B i. comprises one or more polyisocyanates B1 which have on average 2.4 to 5 NCO groups; and the two-component coating material composition possesses a solids content of at least 96 wt %, preferably at least 98 wt %, and more preferably at least 99 wt %, based on the total weight of the two-component coating material composition according to ASTM D2369 (2015), and wherein the molar ratio of the NCO groups in the curing component B to the acidic hydrogen atoms of the hydroxyl groups, primary amino groups and secondary amino groups in the paint base component A is from 1:1.15 to 1:0.95, preferably 1:1.1 to 1:0.96, and more preferably 1:1.05 to 1:0.98.

The term "two-component coating material composition" refers to coating materials for which the reaction which leads to curing is initiated by the mixing of two components (paint base and curing agent) in a mandated ratio. The individual components are not coating materials, since either they are not capable of forming films or they do not produce stable films (Römpp Lacke und Druckfarben; entry heading "two-component paint").

The term "aliphatic radical" herein represents a radical which contains no aromatic structures.

The term "hydrocarbon radical" herein represents radicals which contain exclusively carbon atoms and hydrogen atoms, unless it is indicated that the radical in question may additionally include certain other groups or atoms.

The term "acidic hydrogen atom" in relation to hydroxyl groups and also to primary and secondary amino groups refers to the hydrogen atom bonded to the oxygen atom of a hydroxyl group, or to the two hydrogen atoms bonded to the nitrogen atom of a primary amino group, and also to the hydrogen atom bonded to the nitrogen atom of a secondary amino group.

The solids content was determined according to ASTM D2369 (from 2015) at 110° C. for 60 minutes on a sample of approximately 2 grams of the two-component coating material composition.

Two-Component Coating Material Composition

The constituents described in more detail below for the paint base component A and curing component B, including in particular the constituents possibly subject to different degrees of preference, may generally be selected independently of one another, and so, for example, the selection of an especially preferred constituent does not necessarily mean that it can be combined only with other preferred, more preferred or especially preferred constituents. This is not to say that in certain cases it may be particularly sensible and preferable, when using a particular preferred constituent, to select another preferred constituent as well. For example, the optional pigments A8 are customarily employed in combination with wetting and dispersing agents A9 and are preferably also combined with polyamines A5, more preferably with the preferred polyamines A5. Where, therefore, preferred combinations are described hereinafter, they should not necessarily be understood as mandatory combinations, but instead merely as a particularly preferred embodiment.

Constituents of the Paint Base Component A

Polyols A1

The polyols A1 are selected from the group of polyols containing ester groups. The polyols A1 are preferably aliphatic polyols.

The polyols A1 are preferably polyester polyols or polyester-polyether polyols, or mixtures of the aforesaid polyols.

The polyols A1 or the polyol mixture A1 preferably possess a hydroxyl number of 340 to 460 mg KOH/g, preferably 360 to 440 mg KOH/g, more preferably 380 to 420 mg KOH/g. The hydroxyl number for the purposes of the present invention may be determined according to EN ISO 4629-2:2016.

The polyols A1 preferably have a hydroxyl group functionality of 3 to 5, more preferably a hydroxyl group functionality of 3 to 4.

More preferably the polyols A1 are branched.

Very preferably the polyols A1 are branched polyols containing ester groups and having a hydroxyl number of 300 to 500 mg KOH/g, better still a hydroxyl number of 340 to 460 mg KOH/g and a hydroxyl group functionality of 3 to 4.

Aliphatic Polyols A2 Free from Ether Groups and Ester Groups

The coating material compositions of the invention comprise one or more aliphatic polyols A2 free from ether groups and ester groups, of the general formula (I)

in which $R^1$ is a p-valent branched, cyclic or linear, preferably branched, saturated or unsaturated, preferably saturated, aliphatic hydrocarbon radical having 5 to 18, preferably 6 to 16, more preferably 7 to 12, more particularly 8 to 11, such as 8, 9, or 10, carbon atoms, the radical $R^1$ optionally comprising one or more, preferably one to three, more preferably two tertiary amino groups, and p is 2 to 6, preferably 2 to 5, more preferably 2 to 4.

Between two immediately adjacent hydroxyl groups there are preferably not more than 2 to 6, more preferably 3 to 5, carbon and/or nitrogen atoms.

The constituent A2, in other words the aliphatic polyol A2 free from ether and ester groups, or the mixture of the aliphatic polyols A2 free from ether and ester groups, preferably possesses a hydroxyl number in the range from 500 to 1000 mg KOH/g, more preferably from 600 to 900 mg KOH/g, and very preferably from 650 to 850 mg KOH/g, more particularly 700 to 800 mg KOH/g. More preferably the radicals $R^1$ are one or more radicals selected from the group consisting of $CH_2C(C_2H_5)$ $(C_4H_8)$ $CH_2$, $CH_2C(CH_3)_2CHCH(CH_3)_2$, and $(H_3CCHCH_2)_2NCH_2CH_2N(CH_2CHCH_3)_2$.

Especially preferred aliphatic polyols A2 free from ether groups are, for example, 2-butyl-2-ethylpropanediol and 2,2,4-trimethyl-1,3-pentanediol, in which the two hydroxyl groups are separated by three carbon atoms ($C^1$—$C^2$—$C^3$), or N,N,N',N'-tetrakis(2-hydroxypropyl) ethylenediamine, in which between two immediately adjacent hydroxyl groups the sum of the carbon and/or nitrogen atoms is 5 ($C^1$—$C^2$—$N^3$—$C^4$—$C^5$).

Based on the sum of the constituents A1 and A2, the hydroxyl number is preferably 400 to 650 mg KOH/g, more preferably 450 to 600 mg KOH/g and very preferably 480 to 580 mg KOH/g.

Species A3

The species A3 possesses a structure which can be reproduced by the following formula (II):

$$R^2—(C=O)_r—O-(AO)_s—R^3 \quad (II)$$

in which $R^2$ is a saturated or unsaturated, aliphatic hydrocarbon radical having 6 to 30, preferably 8 to 26, more preferably 10 to 24, and very preferably 12 to 24 carbon atoms, $R^3$ is H, a radical $PO(OH)_2$, or the optionally partially phosphated radical of a mono- or disaccharide, or the optionally partially phosphated radical of an alditol, more particularly of sorbitol, AO represents one or more alkylene oxide radicals selected from the group consisting of ethylene oxide, propylene oxide, and butylene oxide, r is 0 or 1, and s is 0 to 30, preferably 1 to 25 or 2 to 25, more preferably 4 to 22 or 6 to 20, and very preferably 8 to 18.

The radicals $R^2$ are preferably acyclic radicals.

The radicals AO may be identical or different and within the s radicals they may be arranged randomly, in blocks or in gradients. Where two or more different kinds of AO are present, it is preferred if the fraction of ethylene oxide is more than 50 mol %, more preferably at least 70 mol %, and very preferably at least 90 mol %, based on the total number of radicals AO. In the aforesaid cases the radicals other than ethylene oxide are preferably propylene oxide radicals.

Where r=0 and s>0, the species of the formula (II) are alkoxylated fatty alcohols, preferably ethoxylated fatty alcohols, which optionally are phosphated ($R^3$=PO(OH)$_2$) or are etherified with a mono- or disaccharide or with the radical of an alditol.

Where r=1 and s>0, the species of the formula (II) are alkoxylated fatty acids, preferably ethoxylated fatty acids, which optionally are phosphated ($R^3$=PO(OH)$_2$) or are etherified with a mono- or disaccharide or with the radical of an alditol.

Where s=0 and $R^3$ is the radical of a mono- or disaccharide or the radical of an alditol, the species of the formula (II) are fatty alcohol ethers of a mono- or disaccharide or of an alditol (r=0), or are fatty acid esters of a mono- or disaccharide or of an alditol (r=1).

More preferably it is the case that for some or all species of the formula (II), s is 2 to 25, better still 6 to 20, and best of all 8 to 18, and/or, for some or all species of the formula (II), s is 0 and $R^3$ is an optionally partially phosphated radical of a mono- or disaccharide or an optionally partially phosphated radical of an alditol.

In particular it is also possible to use mixtures of the species A3, in which for at least one species s is 0 and for at least one further species s is >0, preferably 1 to 25 or 2 to 25, more preferably 4 to 22 or 6 to 20, and very preferably 8 to 18.

Very particular preference is given to mixtures which comprise above-stated alkoxylated fatty alcohols with s>0 and/or above-stated alkoxylated fatty acids with s>0 and at least one further species selected from the group encompassing optionally phosphated or etherified fatty alcohols with r=s=0 and $R^3$=H, PO(OH)$_2$, a monosaccharide radical, disaccharide radical, or alditol radical, and optionally phosphated or esterified fatty acids with r=1, s=0, and $R^3$=H, PO(OH)$_2$, a monosaccharide radical, disaccharide radical, or alditol radical.

Crosslinking Catalysts A4

The crosslinking catalyst serves primarily to catalyze the reaction between the free isocyanate groups in the polyisocyanates B1 and the hydroxyl-containing constituents, and/or constituents comprising primary amino groups and/or secondary amino groups, in the paint base component A.

The crosslinking catalyst or catalysts A4 are selected from the group of organotin compounds, preferably from the group of dialkyltin dicarboxylates and dialkyltin dimercaptides.

The dialkyltin dicarboxylates preferably possess the general formula (III)

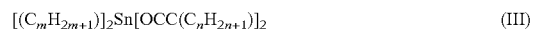
$$[(C_mH_{2m+1})]_2Sn[OCC(C_nH_{2n+1})]_2 \quad (III)$$

where m=1 to 10, preferably m=4 to 8, and n=5 to 15, preferably n=7 to 13, and more preferably n=9 to 11. Established dialkyltin dicarboxylates include in particular dibutyltin dilaurate and especially dioctyltin dilaurate.

The dialkyltin dimercaptides preferably possess the general formula (IV)

$$[(C_mH_{2m+1})]_2Sn[S(C_nH_{2n+1})]_2 \quad (IV)$$

where m=1 to 10, preferably m=4 to 8, and n=6 to 16, preferably n=8 to 14, and more preferably n=10 to 12. Established among the dialkyltin dimercaptides are, in particular, dimethyltin dilaurylmercaptide.

Especially preferred species are dioctyltin dilaurate and dimethyltin dilaurylmercaptide. It has proven exceptionally advantageous to use dioctyltin dilaurate, since in the intended application this compound not only acts as a catalyst but also, surprisingly, improves the release of the coated substrate from the mold.

Polyamines A5

The polyamines A5 possess an amine number of 120 to 280 mg KOH/g, preferably an amine number of 150 to 250 mg KOH/g, and more preferably an amine number of 170 to 220 mg KOH/g.

The polyamines A5 further possess at least two secondary amino groups, preferably precisely two secondary amino groups. The polyamine A5 preferably contains no hydroxyl groups and more preferably no further amino groups other than the secondary amino groups. Very preferably A5, apart from the secondary amino groups, contains no groups reactive toward NCO groups, more particularly no hydroxyl groups, no primary amino groups, and no carboxyl groups.

A5 preferably contains ester groups, more preferably twice as many ester groups as secondary amino groups.

Especially preferred polyamines A5 may be shown through the general formula (V):

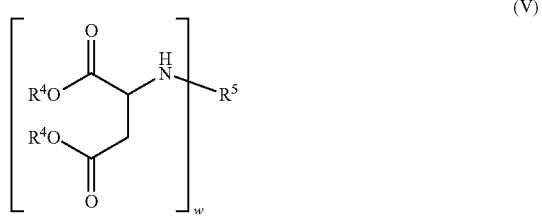

in which
the radicals $R^4$ independently of one another are branched or unbranched alkyl radicals having 1 to 6, preferably 1 to 4 carbon atoms, and very preferably are methyl, ethyl, propyl, or butyl,
the radical $R^5$ is a w-valent aliphatic and/or cycloaliphatic hydrocarbon radical having 6 to 24, preferably 8 to 20, more preferably 10 to 18, and very preferably 12 to 16 carbon atoms, such as a hydrocarbon radical having 13, 14, or 15 carbon atoms, for example, and
w is 2 to 4, preferably 2 or 3, more preferably 2.

Very preferably the polyamines A5 are Michael adducts of 1 mol of a diamine having two primary amino groups and 2 mol of a maleic dialkyl ester. In a Michael addition of this kind, one primary amino group each is added onto one carbon-carbon double bond of the maleic diester.

These last-mentioned, especially preferred polyamines A5 are diamines A5 and may be shown through the following structural formula (Va):

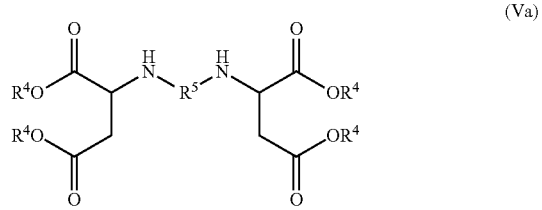

in which
the radicals $R^4$ independently of one another are branched or unbranched alkyl radicals having 1 to 6, preferably 1 to 4 carbon atoms, and very preferably are methyl, ethyl, propyl, or butyl, preferably an ethyl radical,
the radical $R^5$ is a divalent aliphatic and/or cycloaliphatic hydrocarbon radical having 6 to 24, preferably 8 to 20, more preferably 10 to 18, and very preferably 12 to 16 carbon atoms, such as 13, 14, or 15 carbon atoms, for example.

Especially preferably the divalent radical $R^5$ in the above formula contains cycloaliphatic structures and 13 to 15 carbon atoms. Examples of particularly suitable radicals $R^5$ are the divalent radicals of the formula (VI) below:

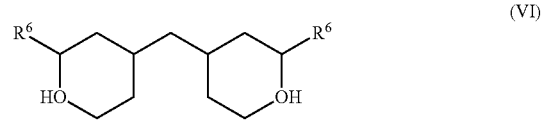

in which the radicals $R^6$ independently of one another are hydrogen or an alkyl radical having 1 to 4 carbon atoms, in particular a methyl, ethyl, propyl, or butyl radical, preferably a methyl radical.

The use of the polyamines A5 in the coating material compositions of the invention has emerged as being very advantageous when the coating materials of the invention are pigmented and/or filled coating materials. In the preparation of the pigmented paint base component A, the polyamines A5 are preferably employed such that first of all a milling paste is produced using them, comprising the pigment or pigments A8 and/or fillers A8, and also using the additives A9, and this milling paste is mixed homogeneously with the other paint base constituents.

Polyether Diol A6

The coating material compositions of the invention preferably comprise polyether diols A6 of the general formula (VII)

$$HO\text{-}(AO)_t\text{-}H \qquad (VII)$$

in which the radicals AO independently of one another are alkylene oxide radicals selected from the group consisting of ethylene oxide, propylene oxide, and butylene oxide, and t is 5 to 30, preferably 8 to 25, more preferably 10 to 20, and very preferably 12 to 18.

The radicals AO may be identical or different and within the t radicals they may be arranged randomly, in blocks or in gradients. Where two or more different kinds of AO are present, it is preferred if the fraction of propylene oxide radicals is more than 50 mol %, more preferably at least 70 mol %, and very preferably at least 90 mol %, such as, in particular, 100 mol %.

Very preferably the polyether diols A6 are polypropylene oxides (AO=propylene oxide), more particularly polypropylene oxides in which t is 8 to 25, preferably 10 to 20, and more preferably 12 to 18.

The polyether diols A6 in the coating material composition function as reactive diluents. Long-chain polyether diols A6, preferably those with t>10, have an additionally flexibilizing influence on the cured coating in this case.

Polyether-Modified Alkylpolysiloxanes A7

Not necessarily, though preferably, the coating material compositions of the invention include small amounts of polyether-modified alkylpolysiloxanes A7, preferably of polyether-modified methylpolysiloxanes. The addition of preferably 0.5 to 5 wt %, more preferably 1 to 4 wt %, and very preferably 1 to 3 wt % of polyether-modified alkylpolysiloxanes, more particularly of the aforesaid quantities of polyether-modified methylpolysiloxanes, based on the total weight of the paint base component A, results in an improved effect of the species A3 on the mold release effect of the cured, coated, fiber-reinforced component from the mold.

Pigments A8 and/or Fillers A8

The coating material compositions of the invention may be present in a form pigmented and/or filled with fillers. Pigments and fillers used may in principle be all organic and inorganic pigments and fillers.

For the purposes of the present invention there is no need for a sharply drawn distinction between pigments and fillers. Distinction in practice frequently employs the refractive index. If this index is above 1.7, it is usual to use the term "pigments"; if below this figure, "fillers".

Typical inorganic pigments are oxide pigments and oxide hydroxide pigments, such as titanium dioxide, zinc oxide, iron oxide, and chromium oxide, for example, mixed-phase oxide pigments, such as bismuth-molybdenum-vanadium oxide yellow, chromium-titanium yellow, spinel blue, iron-manganese brown, zinc-iron-brown, iron-manganese black, and spinel black, for example, sulfide pigments and sulfide selenide pigments, such as zinc sulfide, for example, lithopone, cadmium yellow and cadmium red, mixed-phase chromate and chromate-molybdenum pigments, such as chromium yellow and molybdate orange and molybdate red, for example, complex salt pigments, such as Prussian blue, for example, silicate pigments, such as aluminum silicate, for example, and ultramarine (blue, violet, and red), pigments consisting of chemical elements, such as aluminum, copper-zinc alloys, and especially pigmentary carbon black, for example, and also other pigments, such as barium sulfate, for example.

Typical organic pigments are monoazo pigments, disazo pigments, and polycyclic pigments such as perylene pigments and phthalocyanine pigments, for example.

Typical inorganic fillers are silicates, such as talc and kaolin, for example, silicas, such as precipitated or fumed silicas, for example, oxides, such as aluminum hydroxide or magnesium hydroxide, for example, sulfates, such as blanc fixe and calcium sulfate, for example, and also various carbonates.

Additives A9

The coating material compositions of the invention may comprise additives different from constituents A1 to A8, from the group of the wetting and/or dispersing agents, rheological assistants and flow control agents. Wetting and dispersing agents are used especially when the coating material composition of the invention comprises one or more pigments A8 and/or fillers A8.

Constituents of the Curing Component B

Polyisocyanates B1

The curing component B comprises polyisocyanates B1 which possess an NCO group functionality of greater than 2.4 to 5, preferably 2.6 to 4, more preferably 2.8 to 3.6.

The polyisocyanates B1 are preferably oligomers, preferably trimers or tetramers, of diisocyanates. More preferably they are iminooxadiazinediones, isocyanurates, allophanates and/or biurets of diisocyanates, very preferably iminooxadiazinediones and/or trimers containing allophanate groups.

More preferably the polyisocyanates B1 of the curing component B are aliphatic and/or cycloaliphatic, very preferably aliphatic, polyisocyanates.

With particular preference, hexamethylenediisocyanate and/or isophorone diisocyanate, very particularly just hexamethylene diisocyanate, serves as the diisocyanate basis of the aforementioned oligomers, especially of the aforementioned trimers or tetramers.

Very preferably the curing component B comprises aliphatic polyisocyanates B1 based on trimers and/or tetramers of aliphatic diisocyanates, preferably trimers of aliphatic diisocyanates selected from the group consisting of hexamethylene diisocyanate and isophorone diisocyanate, preferably just hexamethylene diisocyanate, with the polyisocyanates containing at least one iminooxadiazinedione, isocyanurate and/or allophanate structure.

Through the selection of the polyisocyanate B1 or of a combination of polyisocyanates B1 it is possible to influence the hardness of the resulting cured coating.

In particular, the use of polyisocyanates B1 containing iminooxadiazinedione structures leads to coatings with particular hardness, thereby preventing substrate structures from propagating through to the cured coating surface and constituting unwanted waviness there. Polyisocyanates of this kind are available for example from Covestro under the name Desmodur N3900.

Similar results can be achieved with polyisocyanates B1 containing isocyanurate structures, of the kind obtainable, for example, under the name Desmodur N3800 from Covestro, with the coating still being hard but being more flexible.

Polyisocyanates B1 containing allophanate structures are used not exclusively, though preferably, in pigmented coating material compositions of the invention, especially those which also comprise the constituents A5. Polyisocyanates B1 containing allophanate structures are likewise available from Covestro, under the name Desmodur N3500, for example.

Further Coating Material Constituents

Further Additives A10 and/or B2

The further additives A10, different from the paint base constituents A1 to A9, are generally, if they are used at all, constituents of the paint base component A.

Provided these further additives are not reactive toward the curing component B, however, they may in principle also be used as additives B2 in the curing component B.

Examples of suitable additives A10 and/or B2 are UV absorbers, light stabilizers, radical scavengers, thermolabile radical initiators, crosslinking catalysts other than the crosslinking catalysts A4, polyols other than the polyols A10 of the other constituents, such as, for example, mono- or disaccharides or alditols such as, in particular, sorbitol, deaerating agents, slip additives, polymerization inhibitors, defoamers, emulsifiers, adhesion promoters, film-forming assistants, or flame retardants. Other examples of suitable coating additives are described in the textbook Lackadditive [Additives for Coatings] by Johan Bieleman, Wiley-VCH, Weinheim, N.Y., 1998.

Unwanted constituents of the coating material compositions of the invention are those which on determination of solids content (110° C., 60 min, ASTM D2369 (2015)) are volatile. In accordance with the invention the fraction of such constituents is at most 4 wt %, preferably at most 3, better still at most 2, or ideally at most 1 wt %, based on the total weight of the coating material composition of the invention. Examples of unwanted constituents of this kind are water and volatile organic solvents that are nonreactive relative to free isocyanate groups in the coating material composition. Since, however, it is partially unavoidable for water to enter the coating materials by way of residual moisture from pigments and fillers, for example, or for volatile organic solvents to enter via certain additives which are only available as preliminary solutions in such volatile organic solvents, unwanted constituents of these kinds in the limits above are generally tolerable. Preferably, however, such constituents are removed by drying or distillation before the constituents containing them are used, or, in the case of the volatile organic solvents, are replaced by reactive diluents before being used in the paint base or curing agent.

Examples of Preferred Embodiments of the Two-Component Coating Material Composition of the Invention The paint base component A preferably comprises
i. one or more branched, aliphatic polyols A1 which are selected from the group of polyols containing ester groups and possessing a hydroxyl number of 360 to 440 mg KOH/g and having a hydroxyl group functionality of 3 to 4;
ii. one or more aliphatic polyols A2 free from ether groups and ester groups, of the general formula (I)

$$R^1\text{---}(OH)_p \tag{I}$$

in which $R^1$ is a p-valent branched, saturated aliphatic hydrocarbon radical having 5 to 18 carbon atoms, the radical $R^1$ optionally comprising two tertiary amino groups, and p is 2 to 4;
iii. one or more species A3 of the general formula (II)

$$R^2\text{---}(C=O)_r\text{---}O\text{-}(AO)_s\text{---}R^3 \tag{II}$$

in which $R^2$ is a saturated or unsaturated, aliphatic hydrocarbon radical having 6 to 30 carbon atoms, $R^3$ is H, a radical $PO(OH)_2$, or the optionally partially phosphated radical of a monosaccharide or the optionally partially phosphated radical of an alditol, AO represents one or more alkylene oxide radicals selected from the group consisting of ethylene oxide and propylene oxide,
r is 0 or 1, and s is 0 to 30,
iv. one or more crosslinking catalysts A4 selected from the group of dialkyl tin dicarboxylates and dialkyl tin dimercaptides,
v. one or more polyamines A5 having two secondary amino groups and an amine number of 120 to 280 mg KOH/g, in the event that there are also one or more pigments A8 and/or one or more fillers A8 present in the paint base component A,
vi. optionally one or more polyether diols A6, comprising propylene oxide units and optionally ethylene oxide units;
vii. one or more polyether-modified methylpolysiloxanes A7;
viii. optionally one or more pigments A8 and/or one or more fillers A8; and
ix. one or more additives A9 selected from the group consisting of wetting and/or dispersing agents, rheological assistants, and flow control agents, in the event that there are also one or more pigments A8 and/or one or more fillers A8 present in the paint base component A.

The paint base component A more preferably comprises
i. one or more branched, aliphatic polyols A1 which are selected from the group of polyols containing ester groups and possessing a hydroxyl number of 340 to 460 mg KOH/g and having a hydroxyl group functionality of 3 to 4;
ii. one or more aliphatic polyols A2 free from ether groups and ester groups, of the general formula (I)

$$R^1\text{---}(OH)_p \tag{I}$$

in which $R^1$ is a p-valent branched, saturated aliphatic hydrocarbon radical having 7 to 12 carbon atoms, the radical $R^1$ optionally comprising two tertiary amino groups, and p is 2 to 4;
iii. one or more species A3 of the general formula (II)

$$R^2\text{---}(C=O)_r\text{---}O\text{-}(AO)_s\text{---}R \tag{II}$$

in which $R^2$ is a saturated or unsaturated, aliphatic hydrocarbon radical having 10 to 24 carbon atoms, $R^3$ is H, a radical $PO(OH)_2$, or the optionally partially phosphated radical of a monosaccharide or the optionally partially phosphated radical of an alditol, AO represents one or more alkylene oxide radicals selected from the group consisting of ethylene oxide and propylene oxide,
r is 0 or 1, and s is 0 to 30,
iv. one or more crosslinking catalysts A4 selected from the group of dialkyl tin dicarboxylates and dialkyl tin dimercaptides,
v. one or more polyamines A5 having at least two secondary amino groups and an amine number of 150 to 250 mg KOH/g, in the event that there are also one or more pigments A8 and/or one or more fillers A8 present in the paint base component A,
vi. optionally one or more polyether diols A6, comprising propylene oxide units and optionally ethylene oxide units;
vii. one or more polyether-modified methylpolysiloxanes A7;
viii. optionally one or more pigments A8 and/or one or more fillers A8; and
ix. one or more additives A9 selected from the group consisting of wetting and/or dispersing agents, rheological assistants, and flow control agents, in the event that there are also one or more pigments A8 and/or one or more fillers A8 present in the paint base component A.

The paint base component A especially preferably comprises
i. one or more branched, aliphatic polyols A1 which are selected from the group of polyols containing ester groups and possessing a hydroxyl number of 340 to 460 mg KOH/g and having a hydroxyl group functionality of 3 to 4;
ii. one or more aliphatic polyols A2 free from ether groups and ester groups, of the general formula (I)

$$R^1\text{---}(OH)_p \tag{I}$$

in which $R^1$ is a p-valent branched, saturated aliphatic hydrocarbon radical having 7 to 12 carbon atoms, at most 2 to 6 carbon atoms being present between two immediately adjacent hydroxyl groups, the radical $R^1$ optionally comprising two tertiary amino groups, p is 2 to 4, and the polyol or polyols A2 possess a hydroxyl number of 650 to 850 mg KOH/g;
iii. two or more species A3 of the general formula (II)

$$R^2\text{---}(C=O)_r\text{---}O\text{-}(AO)_s\text{---}R^3 \tag{II}$$

in which $R^2$ is a saturated or unsaturated, aliphatic hydrocarbon radical having 10 to 24 carbon atoms, $R^3$ is H, a radical $PO(OH)_2$, or the optionally partially phosphated radical of a monosaccharide or the optionally partially phosphated radical of an alditol, AO represents one or more alkylene oxide radicals selected from the group consisting of ethylene oxide and propylene oxide,
r is 0 or 1, and, for at least one species, s is 0, and, for at least one further species, s is 2 to 25, preferably 6 to 20,
iv. a crosslinking catalyst A4 selected from the group of dialkyl tin dicarboxylates,
v. one or more polyamines A5, in the event that there are also one or more pigments A8 and/or one or more fillers A8 present in the paint base component A, the polyamine or polyamines A5 carrying at least two secondary amino groups and possessing an amine number of 150 to 250 mg KOH/g and a structure of the general formula (V)

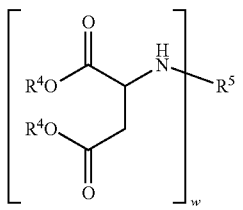

in which
the radicals $R^4$ independently of one another are branched or unbranched alkyl radicals having 1 to 6 carbon atoms, the radical $R^5$ is a w-valent aliphatic and/or cycloaliphatic hydrocarbon radical having 6 to 24 carbon atoms, and
w is 2 to 4,
vi. optionally one or more polyether diols A6, comprising more than 50 mol % of propylene oxide radicals and optionally ethylene oxide radicals;
vii. one or more polyether-modified methylpolysiloxanes A7;
viii. optionally one or more pigments A8 and/or one or more fillers A8; and
ix. one or more additives A9 selected from the group consisting of wetting and/or dispersing agents, rheological assistants, and flow control agents, in the event that there are also one or more pigments A8 and/or one or more fillers A8 present in the paint base component A.

The curing component B preferably comprises
i. one or more aliphatic polyisocyanates B1 which have on average 2.4 to 4 NCO groups.

The curing component B more preferably comprises
i. one or more aliphatic polyisocyanates B1 which have on average 2.6 to 4 NCO groups and are trimers and/or tetramers of diisocyanates, and the trimers and/or tetramers are selected from the group of iminooxadiazinediones, isocyanurates, allophanates, and biurets.

The curing component B especially preferably comprises
i. one or more aliphatic polyisocyanates B1 which have on average 2.8 to 3.6 NCO groups and are trimers and/or tetramers of diisocyanates, and the trimers and/or tetramers are selected from the group of iminooxadiazinediones, isocyanurates, and allophanates, and the diisocyanates are selected from the group consisting of hexamethylene diisocyanate and isophorone diisocyanate.

Quantities of the Constituents Used

The below-specified percentage fractions of constituents A1 to A10 in the paint base component A, and also B1 and B2 in the curing component, are valid for all above-stated embodiments of the invention. The percentage fractions therefore apply both to the broadest definition of the constituent in question and to the most preferred variant of the constituent in question, equally. This is the case irrespective of whether the constituent in question consists of one species or a plurality of species of said constituent.

The weight sum of constituents A1 to A9 and B1 within the total weight of the two-component coating material composition of the invention is preferably at least 90 wt %, more preferably at least 95 wt %, and very preferably at least 97 or at least 98 wt %. With particular preference the two-component coating material composition of the invention consists of constituents A1 to A9 and B1.

Where the two-component coating material composition of the invention is one which contains no constituents A8, the weight sum of the constituents A1, A2, A3, A4, A6, A7, and B1 is preferably at least 90 wt %, more preferably at least 95 wt %, and very preferably at least 97 or 98 wt %. In such a case, the two-component coating material composition of the invention very preferably consists of constituents A1 to A4, A6, A7, and B1.

The amounts of constituents A1, A2, and, where present, A5 may vary within wide ranges in the paint base component A. It is preferred here for the weight sum of constituents A1, A2, and A5, based on the total weight of the paint base component A, to be 75 to 95 wt %, more preferably 80 to 93 wt %, and very preferably 82 to 90 wt %.

The amount of constituents A1 in relation to the weight sum of constituents A1 and A2 may likewise vary within wide ranges. Preferably the fraction of constituents A1, based on the weight sum of constituents A1 and A2, is more than 50 wt %, more preferably more than 55 wt % and less than 80 wt %, very preferably 58 to 75 wt % or 60 to 70 wt %.

The entirety of the species A3 is present preferably in an amount of 1 to 7 wt %, more preferably 2 to 6 wt %, and very preferably in an amount of 3 to 5 wt %, based on the total weight of the paint base component A.

The crosslinking catalyst or catalysts A4 are used preferably in an amount of 0.15 to 1.5 wt %, more preferably 0.2 to 1.0 wt %, more particularly 0.25 to 0.8 wt %, based on the total weight of the paint base component A.

Where there are one or more constituents A5 in the two-component coating material composition of the invention, the fraction thereof within the weight sum of constituents A1, A2, and A5 is preferably less than 50 wt %, more preferably less than 45 wt %, and more preferably less than 40 wt %, but preferably more than 10 wt %, more preferably more than 20 wt %, and very preferably more than 30 wt %.

Where there are one or more polyether diols A6 in the two-component coating material composition of the invention, the amount thereof is preferably 1 to 10 wt %, more preferably 2 to 8 wt %, very preferably 3 to 7 wt % or 4 to 6 wt %, based on the total weight of the paint base component A.

Where there are one or more polyether-modified alkylpolysiloxanes A7 in the two-component coating material composition of the invention, the amount thereof is preferably 0.5 to 5 wt %, more preferably 1 to 4 wt %, very preferably 1 to 3 wt % or 2 to 3 wt %, based on the total weight of the paint base component A.

The amount of pigments A8 and/or fillers A8 in the two-component coating material composition of the invention may vary within wide ranges. The total amount of pigments and/or fillers is preferably 0.1 to 20 wt %, more preferably 0.3 to 10 wt %, and very preferably 0.5 to 5 wt %, based on the total weight of the paint base component A, according to the hiding power of the pigments or the desired degree of filling.

The amount of additives A9 in the two-component coating material composition of the invention may likewise vary within wide ranges. Where there are flow control agents in the two-component coating material compositions of the invention, the amount of said agents, based on the total weight of the paint base component A, is preferably 0.1 to 2 wt %, more preferably 0.2 to 1.5 wt %, and more preferably 0.3 to 1 wt %. Equal quantity ranges are valid preferably for the rheological assistants as well. The amount of wetting and dispersing agents customarily varies within wider ranges, dependent in particular on the pigment content and/or filler content and on the nature of the pigments and/or fillers. The amount of wetting and dispersing agents, based on the total weight of the paint base component A, customarily, is preferably 0.1 to 5 wt %, more preferably 0.2 to 3 wt %. The total amount of additives A9, based on the total weight of the paint base components, is preferably 0 to 8 wt %, more preferably 0.1 to 5 wt %, and very preferably 0.5 to 4 wt %.

The curing component B comprises preferably at least 80 wt %, more preferably at least 90 wt %, and very preferably at least 95 wt %, better still 100 wt %, of polyisocyanates B1. It is, however, also possible for the curing component to comprise further di- or polyisocyanates B3 which do not fall within the definition of the polyisocyanates B1, more particularly those having an NCO functionality which is less than 2.4 or greater than 5.

Based on the total weight of the two-component coating material composition of the invention, the optional additives A10 and B2 may be present in a total amount of 0 up to a maximum of 8 wt %, preferably a maximum of 5 wt %, such as, for example, 0.5 to 8 wt % or 1 to 5 wt %.

Method for Coating Fiber-Reinforced Plastics

A further subject of the present invention is a method for coating fiber-reinforced plastics and/or components comprising such plastics. A component is understood herein, as usual, to be an individual part which, in conjunction with other components, forms a structural assembly. Where, for example, the component is the part of a vehicle body, it may be assembled with other bodywork components to form a body. The method of the invention for coating fiber-reinforced plastics is described with reference to the example of the coating of components made of fiber-reinforced plastics. Generally, however, irrespective of the purpose of the fiber-reinforced plastic as being able to serve as a component, the invention concerns in general the coating of fiber-reinforced plastics, and is therefore not confined to components in the above sense. Where reference is made below, therefore, to the coating of components made of a fiber-reinforced plastic, this also encompasses, generally, the coating of fiber-reinforced plastics without "component function".

In the method of the invention, a component made of a fiber-reinforced plastic is preferably placed into a mold. The method of the invention does not require that the mold be coated with a release agent or mold release assistant. The mold is closed except for a gap between the component made of a fiber-reinforced plastic, and the mold, thus forming a hollow between the mold and the component made of a fiber-reinforced plastic. The hollow is subsequently flooded with the coating material of the invention, and the coating material of the invention is cured. The width of the gap here is made such that the film thickness of the cured coating material is preferably 100 to 250 μm, more preferably 125 to 225 μm, and very preferably 150 to 200 μm. After curing, the coated component made of a fiber-reinforced plastic is removed from the mold, or demolded. The coated component made of the fiber-reinforced plastic may be coated directly—without a sanding operation, and possibly after simple cleaning—with further coating materials such as, for example, one or more basecoat materials and one or more clearcoat materials, to form one or more basecoat films and one or more clearcoat films, respectively. With preference, no primer-surfacer coat is applied to the inventively coated fiber-reinforced plastic, but instead directly a basecoat film.

Basecoat and clearcoat materials which can be used are in principle all basecoat and clearcoat materials, respectively, that are conventionally employed within OEM finishing or refinishing. Such basecoat and clearcoat materials are available, for example, from BASF Coatings GmbH, with clearcoat materials that have performed particularly well including, in particular, clearcoats from the EverGloss product line.

The coating with the two-component coating material composition of the invention is obtained preferably in the surface resin transfer molding process, which was established by KraussMaffei Group GmbH and which may be regarded as one embodiment of the above method. A description of the process can be found for example by Renkl, Schmidhuber & Fries in: *Kunststoffe March* 2014, pages 86-89. The machines or units which can be used for this process are likewise available from KraussMaffei Group GmbH (under the Minidos name, for example).

Typically, the paint base component A and the curing component B of the two-component coating material composition of the invention are supplied via separate feed lines to the mixing head of the unit. The paint base component A and curing component B supplied have preferably been preheated to temperatures of between 40 and 80° C., more preferably 50 to 75° C., such as 55 to 70° C., for example. They are fed preferably under pressure in the range from 160 to 200 bar, more preferably 170 to 190 bar. The reaction time varies in general in the range from 1 to 6 min, typically 2 to 4 min, at a mold temperature in the range from preferably 100 to 140° C., more preferably 110 to 130° C.

Components made of the fiber-reinforced plastics and used in the method of the invention are preferably preformed fiber-reinforced plastics, more preferably fiber/plastic composites selected from the group consisting of carbon-fiber-reinforced plastics (CRP), glass-fiber-reinforced plastics (GRP), and aramid-fiber-reinforced plastics (ARP). The fibers are present preferably in the form of fiber assemblies, more particularly in the form of woven fabrics, laid scrims, knitted fabrics, tapes, nonwovens and/or matts.

The plastics matrix in which the fibers are embedded is preferably selected from the group of epoxy resins and polyurethanes, more preferably epoxy resins.

Particularly preferred fiber-reinforced plastics and components made thereof comprise carbon fibers in an epoxy resin matrix.

Typical and preferred components made of fiber-reinforced plastics are bodywork parts of motor vehicles. The invention, however, is by no means confined to the coating of bodywork parts of motor vehicles. Instead, all fiber-reinforced plastics and/or components made thereof may be used for coating in the method of the invention, particularly if they are intended for areas of application requiring very high-grade finishes, especially Class A surfaces.

Method for Producing Coated Fiber-Reinforced Plastics

The production and preforming of the fiber-reinforced plastics and/or components thereof to be coated in accordance with the invention may take place preferably in the same mold in which the subsequent coating of the component made of the fiber-reinforced plastic, in accordance with the invention, with the two-component coating material composition of the invention takes place. In the case of the process known as compression RTM (compression resin transfer molding process), a preform comprising one or more plies of the aforementioned fibers or fiber assemblies of the aforementioned fibers is placed into the mold, the mold carrier is closed, and the hollow is evacuated. The liquid, matrix-forming plastic surrounding the fibers is subsequently injected, with the mold being open to a predetermined gap dimension. The mold is subsequently closed, with the liquid plastic being pressed through the preform and wetting the fibers or fiber assemblies. This is followed by curing of the liquid plastic, to form the component made of fiber-reinforced plastic. After curing has been concluded, the mold halves may then be opened again gap-wise, and the component remaining in the mold and made of the fiber-reinforced plastic may be coated directly, as described above, with the two-component coating material of the invention, by flooding of the gap. Since the component made of the fiber-reinforced plastic is produced in the mold itself, it is possible in this way to omit the insertion of the component made of the fiber-reinforced plastic prior to coating, since the component is already located in the mold. The production of such components made of fiber-reinforced plastics is familiar to a person of ordinary skill in the art, and so is not described in any more detail here. A further subject of the present invention, therefore, is a method for producing a coated component made of a fiber-reinforced plastic.

A preferred subject of the present invention is therefore also a two-stage method for producing coated components made of fiber-reinforced plastics, preferably preformed fiber-reinforced plastics, comprising as a first stage the production of a fiber-reinforced plastic or of a component made thereof by means of a compression resin transfer molding process, and as a second stage the coating of the fiber-reinforced plastic or component made thereof, obtained in the first stage, by means of a surface resin transfer molding process, in which the two-component coating material composition of the invention is used in the second stage for coating the fiber-reinforced plastic or component.

The second method stage is preferably carried out immediately following the first method stage, without the fiber-reinforced plastic or component made thereof, obtained in the first stage, being removed from the mold. In this case, therefore, there is likewise no need—as in the case of the pure surface resin transfer molding process—for coating of the mold with mold release agents in order for the coated, fiber-reinforced component to be demolded without damage.

Use of the Coating Materials of the Invention

A further subject of the present invention is the use of the two-component coating material compositions of the invention for coating fiber-reinforced plastics and/or the components made thereof, preferably in the surface resin transfer molding process.

Particularly preferred is the use of the two-component coating material compositions of the invention as coating materials in a two-stage method comprising as a first stage the production of a fiber-reinforced plastic or of a component made thereof by means of a compression resin transfer molding process, and as a second stage the coating of the fiber-reinforced plastic or component made thereof, obtained in the first stage, by means of a surface resin transfer molding process, in which the two-component coating material composition of the invention is used in the second stage for coating the fiber-reinforced plastic or component made thereof.

The second method stage is preferably carried out immediately following the first method stage, without the fiber-reinforced plastic or component made thereof, obtained in the first stage, being removed from the mold. Accordingly there is also no need, before the second stage is carried out, for the mold to be coated with mold release agents.

The invention is illustrated below by means of examples.

EXAMPLES

2K Coating Material Compositions: Examples 1 to 4

All figures in table 1 are figures in parts by weight. The constituents in paint base component A and curing component B add up in each case to 100 parts by weight. Prior to use, paint base component A and curing component B were mixed homogeneously with one another in the stated weight ratio. Unless otherwise indicated, all of the components used are solvent-free (100% solids).

In the preparation of the paint base component A of examples 1 to 3, constituents A1 and A2 were introduced initially and the further constituents A3, A4, A6, and A7 were mixed in with stirring (mixing time about 30 min at a maximum temperature of 60° C.). The paint base material was subsequently filtered and discharged.

In the preparation of the paint base component A of the pigment-containing example 4, a millbase was first prepared from constituents A5, A8, A9a, and A9b, with A5 being introduced initially and with constituents A8, A9a, and A9b being mixed in with stirring (mixing time: 10 min, at a maximum temperature of 60° C.). This was followed by milling in a bead mill (millbase:beads ratio=1:1.5) for 30 min at 2000 rpm with compliance with a maximum temperature of 60° C. (Hegmann fineness<5 μm). To let down the millbase, the further constituents were added with stirring, and mixing took place for 10 min at a maximum temperature. The paint base material was subsequently filtered and discharged.

Paint base component A and curing component B were not homogeneously mixed until shortly before application, in the above-specified weight ratio, in the mixing head of the unit, as described below.

TABLE 1

| | Example 1 | Example 2 | Example 3 | Example 4 |
|---|---|---|---|---|
| Paint base component A | | | | |
| A1 | 57.58 | 57.58 | 57.88 | 35.55 |
| A2 | 29.67 | 29.67 | 29.82 | 18.30 |
| A3 | 5.00 | 5.00 | 5.00 | 5.00 |
| A4 | 0.75 | 0.75 | 0.30 | 0.75 |
| A5 | — | — | — | 30.00 |
| A6 | 5.00 | 5.00 | 5.00 | 5.00 |
| A7 | 2.00 | 2.00 | 2.00 | 2.00 |
| A8 | — | — | — | 1.50 |
| A9a | — | — | — | 1.00 |
| A9b | — | — | — | 0.50 |
| A9c | — | — | — | 0.40 |
| Curing component B | | | | |
| B1a | 100 | 90 | — | — |
| B1b | — | 10 | — | — |
| B1c | — | — | 100 | 100 |
| Weight ratio of paint base material A to curing agent B | 100:141 | 100:157 | 100:171 | 100:130 |

A1: branched, short-chain polyester polyol having a hydroxyl number of about 400 mg KOH/g and a hydroxyl group functionality of between 2.2 and 3
A2: mixture of 2,2,4-trimethylpentane-1,3-diol and 2-butyl-2-ethylpropanediol (53/47, w/w)
A3: mixture of compounds of the formula $R^2$—(C=O),—O—$(AO)_s$—$R^3$ comprising (a) $R^2$ = mixture of saturated and unsaturated hydrocarbon radicals having 12 to 22 carbon atoms, r = 0, AO = mixture of primarily ethylene oxide units and a few propylene oxide units, and $R^3$ = H ($M_n \approx 650$ g/mol); and (b) $R^2$ = unsaturated hydrocarbon radical having 21 carbon atoms, s = 0, and $R^3$ = H

TABLE 1-continued

| | Example 1 | Example 2 | Example 3 | Example 4 |
|---|---|---|---|---|

A4 : dioctyltin dilaurate
A5: secondary diamine based on a polyaspartic ester with an amine number of about 190 mg KOH/g
A6: linear propylene glycol having two terminal hydroxyl groups and a number-average molar mass (via end-group determination) of about 900 g/mol
A7: polyether-modified methylpolysiloxane
A8: highly conductive carbon black pigment
A9a: commercial wetting and dispersing agent (52% in 1:1 methoxypropyl acetate/alkyl benzene) based on a copolymer having acidic groups
A9b: commercial thickener based on an organically modified bentonite clay
A9c: commercial flow control agent based on polyacrylate
B1a: hexamethylene diisocyanate trimer of the iminooxadiazinedione type with an NCO content of 23.5 wt %
B1b: hexamethylene diisocyanate trimer of the isocyanurate type with an NCO content of 11 wt %
B1c: hexamethylene diisocyanate allophanate/trimer with an NCO content of 19.5 wt %

Production of a Coated, Fiber-Reinforced Molding in the Surface RTM Process (A) Production of the Fiber-Reinforced Molding (Minidos Epoxy-RTM/SFT Unit MX 600; Mixing Head 5/8 ULKP-2KVV)

The mold was opened, an external release agent was applied and spread around, a carbon fiber preform (Chomarat) was inserted, and the mold (mold carrier type: CFT 380; closing force: 250 kN) was closed. The epoxy matrix material (resin: Baxxores ER2200 (heated to 83° C.); curing agent: Baxxodur EC2120 (heated to 30° C.)) was introduced under pressure into the mold (resin: 132 bar, nozzle in nozzle: 0.9 mm; curing agent 130 bar, nozzle: 0.4 mm) and cured for 5 min at a mold carrier temperature of between 115 and 130° C.

(B) Coating of the Fiber-Reinforced Molding (Overmolding)

Following the production of the fiber-reinforced molding as per step (A), the mold was opened to a gap, and the coating material composition of example 1 was introduced through two slots under pressure (paint base component A: temperature: 65° C., 0.5 mm slot, 172 bar; curing component B: temperature: 60° C.; 0.6 mm slot, 180 bar) to give a coating having a thickness of 200 μm (cured). The curing of the coating material composition took place at a mold carrier temperature of about 115 to 130° C. (150 s). The coated molding was demoldable without problems and free of residue.

The moldings coated in accordance with the invention can, if need be, be recoated without a costly and inconvenient cleaning operation, let alone sanding procedures. Following transport or prolonged storage, however, it is advisable for the coated moldings to be simply wiped down using a commercial plastics cleaner. No other pretreatments are required.

The fiber-reinforced molding coated in accordance with the invention was recoated with a commercial standard refinish basecoat material (BC JW62-7A52; 10 min at 23° C.; then 15 min at 80° C.) and with a clearcoat material (CC JF71-0408; EverGloss; 10 min at 23° C.; then 45 min at 80° C.) and cured (both products are available from BASF Coatings GmbH).

Subsequently, a constant conditions test was carried out in accordance with DIN EN ISO 6270-2 (2005-09) (240 h at 40° C.) with subsequent evaluation for blistering (visual), by means of the cross-cut test according to DIN EN ISO 2409 (2013-06; DE) (1 h and 24 h after end of exposure) and a steam jet adhesion test according to DIN 55662 (2009-12) (1 h and 24 h after end of exposure). No blistering was observed. In the cross-cut test and steam jet test as well, no delamination of the coating films was found.

What is claimed is:

1. A two-component coating material composition which comprises a paint base component A and a curing component B, wherein the paint base component A comprises:
   i. one or more polyols A1 which are selected from the group of polyols containing ester groups and which possess a hydroxyl number of 300 to 500 mg KOH/g and have a hydroxyl group functionality of greater than 2;
   ii. one or more aliphatic polyols A2 free from ether groups and ester groups, of the general formula (I)

$$R^1—(OH)_p \qquad (I)$$

in which $R^1$ is a p-valent branched, cyclic or linear, saturated or unsaturated, aliphatic hydrocarbon radical having 5 to 18 carbon atoms, the radical $R^1$ optionally comprising one or more tertiary amino groups, and p is 2 to 6;
   iii. one or more species A3 of the general formula (II)

$$R^2—(C=O)_r—O-(AO)_s—R^3 \qquad (II)$$

in which $R^2$ is a saturated or unsaturated, aliphatic hydrocarbon radical having 6 to 30 carbon atoms, $R^3$ is H, a radical $PO(OH)^2$, or the optionally partially phosphated radical of a mono-or disaccharide, or the optionally partially phosphated radical of an alditol, AO represents one or more alkylene oxide radicals selected from the group consisting of ethylene oxide, propylene oxide and butylene oxide,
   r is 0 or 1, and s is 0 to 30;
   iv. one or more crosslinking catalysts A4 selected from the group of organo tin compounds;
   v. optionally one or more polyamines A5 having at least two secondary amino groups and an amine number of 120 to 280 mg KOH/g;
   vi. optionally one or more polyether diols A6;
   vii. optionally one or more polyether-modified alkylpolysiloxanes A7;
   viii. optionally one or more pigments A8 and/or one or more fillers A8; and
   ix. optionally one or more additives A9 selected from the group consisting of wetting and/or dispersing agents, rheological assistants, and flow control agents;
   and wherein the curing component B comprises:
   i. one or more polyisocyanates B1 which have on average 2.4 to 5 NCO groups; and
   the two-component coating material composition possesses a solids content of at least 96 wt %, based on the total weight of the two-component coating material composition according to ASTM D369 (2015), and
   wherein the molar ratio of the NCO groups in the curing component B to the acidic hydrogen atoms of the hydroxyl groups, primary amino groups and secondary amino groups in the paint base component A is from 1:1.15 to 1:0.95.

2. The two-component coating material composition as claimed in claim 1, in which the polyol or polyols A1 are branched polyols containing ester groups and having a hydroxyl number of from 340 to 460 mg KOH/g and a hydroxyl group functionality of 3 to 4.

3. The two-component coating material composition as claimed in claim 1, in which the aliphatic polyol or polyols A2 free from ether groups and ester groups possess the general formula (I)

$$R^1—(OH)_p \qquad (I)$$

in which $R^1$ is a p-valent branched, saturated, aliphatic hydrocarbon radical having 6 to 16 carbon atoms, the radical $R^1$ optionally comprising one to three tertiary amino groups, p is 2 to 4, and 2 to 6 carbon and/or nitrogen atoms are located between two immediately adjacent hydroxyl groups.

4. The two-component coating material composition as claimed in claim 1, in which the aliphatic polyol or polyols A2 free from ether groups and ester groups have a hydroxyl number in the range from 500 to 1000 mg KOH/g.

5. The two-component coating material composition as claimed in claim 1, wherein, in the one or more species A3 of the general formula (II),
   $R^2$ is a saturated or unsaturated, aliphatic hydrocarbon radical having 10 to 24 carbon atoms,
   $R^3$ is H, a radical $PO(OH)_2$, or the optionally partially phosphated radical of a mono- or disaccharide, or the optionally partially phosphated radical of an alditol, more particularly of sorbitol,
   AO represents one or more alkylene oxide radicals selected from the group consisting of ethylene oxide and propylene oxide, r is 0 or 1, and s is 0 or 1 to 25.

6. The two-component coating material composition as claimed in claim 1, wherein, in the one or more species A3 of the general formula (II),
   $R^2$ is a saturated or unsaturated, aliphatic hydrocarbon radical having 10 to 24 carbon atoms,
   $R^3$ is H, a radical $PO(OH)_2$, or the optionally partially phosphated radical of a monosaccharide, or the optionally partially phosphated radical of an alditol, more particularly of sorbitol,
   AO represents one or more alkylene oxide radicals selected from the group consisting of ethylene oxide and propylene oxide, and the ethylene oxide fraction in the entirety of the radicals AO is at least 70 mol %, r is 0 or 1, and s is 0 or s is 6 to 20.

7. The two-component coating material composition as claimed in claim 1, in which the crosslinking catalyst or catalysts A4 are selected from the group of dialkyltin dicarboxylates and dialkyltin dimercaptides.

8. The two-component coating material composition as claimed in claim 1, in which the polyamines A5 possess the general formula (V)
   in which the radicals $R^4$ independently of one another are branched or unbranched alkyl radicals having 1 to 6 carbon atoms,
   the radical $R^5$ is a w-valent aliphatic and/or cycloaliphatic hydrocarbon radical having 6 to 24 carbon atoms, and w is 2 to 4.

9. The two-component coating material composition as claimed in claim 1, in which the polyether diol or diols A6 possess the general formula (VII)

$$\text{HO-(AO)}_t\text{—H} \qquad \text{(VII)}$$

in which the radicals AO independently of one another are alkylene oxide radicals selected from the group consisting of ethylene oxide, propylene oxide, and butylene oxide, and t is 5 to 30.

10. The two-component coating material composition as claimed in claim 1, in which the polyether-modified alkylpolysiloxane or alkylpolysiloxanes A7 are polyether-modified methylpolysiloxanes.

11. The two-component coating material composition as claimed in claim 1, in which the aliphatic polyisocyanate or polyisocyanates B1 are trimers and/or tetramers of diisocyanates, and the trimers and/or tetramers are selected from the group of iminooxadiazinediones, isocyanurates, allophanates, and biurets.

12. The two-component coating material composition as claimed in claim 1, in which
   the weight sum of constituents A1 to A9 and B1 within the total weight of the two-component coating material composition is at least 90 wt %;
   the weight sum of constituents A1, A2, and A5, based on the total weight of the paint base component A, is from 75 to 95 wt %;
   the weight sum of constituents A1, based on the weight sum of constituents A1 and A2, is more than 50 wt %;
   the weight sum of constituents A3, based on the total weight of the paint base component A, is from 1 to 7 wt %;
   the weight sum of constituents A4, based on the total weight of the paint base component A, is from 0.15 to 1.5 wt %;
   the weight sum of constituents A5, based on the weight sum of constituents A1, A2, and A5, is less than 50 wt % to 0 wt %;
   the weight sum of constituents A6, based on the total weight of the paint base component A, is from 0 to 10 wt %;
   the weight sum of constituents A7, based on the total weight of the paint base component A, is from 0 to 5 wt %;
   the weight sum of constituents A8, based on the total weight of the paint base component A, is from 0 to 20 wt %;
   the weight sum of constituents A9, based on the total weight of the paint base component A, is from 0 to 8 wt %; and
   the weight sum of constituents B1, based on the total weight of the curing component B, is at least 90 wt %.

13. A method for coating a fiber-reinforced plastic, wherein
   (1) the fiber-reinforced plastic is placed into a mold,
   (2) the mold is closed except for a gap between fiber-reinforced plastic and mold, to form a hollow between mold and fiber-reinforced plastic,
   (3) the hollow is flooded with a two-component coating material composition as claimed in claim 1,
   (4) the coating material composition is cured, and
   (5) subsequently the coated fiber-reinforced plastic is removed.

14. A method for producing a coated fiber-reinforced plastic, wherein
   (A) a preform of fibers or fiber assemblies which serve for fiber reinforcement of the fiber-reinforced plastic to be produced is placed into the mold,
   (B) the mold is closed except for a gap, and the hollow formed is evacuated,
   (C) subsequently a liquid plastic is injected that forms the matrix of the fiber-reinforced plastic to be produced,
   (D) the mold is closed, with liquid plastic being pressed through the preform and wetting the fibers or fiber assemblies,
   (E) the liquid plastic is cured, to form the fiber-reinforced plastic,
   (F) the mold, directly following step (E), is closed except for a gap between fiber-reinforced plastic and mold, so as to form a hollow between mold and fiber-reinforced plastic,
   (G) the hollow is flooded with a two-component coating material composition as claimed in claim 1,
   (H) the coating material composition is cured, and
   (I) subsequently the coated fiber-reinforced plastic is removed.

15. The method as claimed in claim 13, wherein the fiber-reinforced plastic is in the form of a component selected from bodywork parts of a motor vehicle.

16. The method as claimed in claim 13, wherein the width of the gap in step (2) or step (F) is such that the film thickness of the cured coating material composition is in the range from 100 to 250 μm.

17. The method as claimed in claim 13, wherein
the coated fiber-reinforced plastic, without an intermediate sanding operation, is coated with one or more basecoat films and one or more clearcoat films, and
the basecoat film(s) and clearcoat film(s) are cured separately or jointly.

18. A method for coating fiber-reinforced plastics, the method comprising a use of the two-component coating material composition as defined in claim 1.

19. The method as claimed in claim 14, wherein the fiber-reinforced plastic is in the form of a component selected from bodywork parts of a motor vehicle.

20. The method as claimed in claim 14, wherein the width of the gap in step (2) or step (F) is such that the film thickness of the cured coating material composition is in the range from 100 to 250 μm.

\* \* \* \* \*